United States Patent Office 3,836,521
Patented Sept. 17, 1974

3,836,521
2-LOWER ALKYLTHIO-1H-1,4-BENZODIAZEPINES
James Valentine Earley, Cedar Grove, Rodney Ian Fryer, North Caldwell, and Armin Walser, West Caldwell, N.J., assignors to Hoffmann-La Roche Inc., Nutley, N.J.
No Drawing. Filed Oct. 8, 1971, Ser. No. 187,836
Int. Cl. C07d 53/06
U.S. Cl. 260—239 BD                     7 Claims

ABSTRACT OF THE DISCLOSURE

Novel 1H - 1,4 - benzodiazepine derivatives bearing a lower alkylthio substituent in the 2-position are disclosed. These 2-lower alkylthio-1H-1,4-benzodiazepines are useful as muscle-relaxant, anti-convulsant and sedative agents.

DETAILED DESCRIPTION OF THE INVENTION

The present invention relates to 2-substituted 1,4-benzodiazepines. More particularly, this invention covers 1H-1,4-benzodiazepines substituted in the 2-position with a lower alkylthio group. The invention further comprehends processes for making these novel benzodiazepines.

More specifically, the compounds of the present invention are selected from the group consisting of compounds of the formula

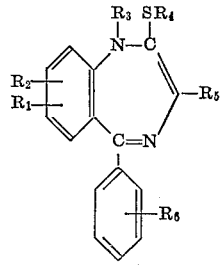

I wherein $R_1$ and $R_2$ are each selected from the group consisting of hydrogen, halogen, trifluoromethyl, lower alkyl, cyano, amino, nitro, di-lower alkylamino, and lower alkoxy; $R_3$ is selected from the group consisting of lower alkyl, lower alkenyl, lower alkynyl, cycloalkyl-lower alkyl, and di-lower alkylamino-lower alkyl; $R_4$ is lower alkyl; $R_5$ is hydrogen or lower alkyl; $R_6$ is selected from the group consisting of hydrogen, halogen, trifluoromethyl, lower alkyl, nitro and lower alkoxy.

and the pharmaceutically acceptable acid addition salts thereof.

As used herein, the term "lower alkyl" either alone or in combination refers to straight and branched chain hydrocarbon groups containing from 1 to 7, preferably from 1–4, carbon atoms, such as, for example, methyl, ethyl, propyl, isopropyl, isobutyl, butyl and the like. The term "lower alkenyl" includes straight and branched chain hydrocarbon groups containing from 2–7 carbon atoms, wherein at least one carbon to carbon bond is unsaturated, such as allyl, butenyl, and the like. The term "lower alkynyl" refers to groups such as propargyl and the like. The term "cycloalkyl-lower alkyl" refers to groups such as cyclopropyl-methyl, cyclobutyl-ethyl and the like. The term "halogen" refers to all four forms thereof, i.e. bromine, chlorine, fluorine and iodine. The term "lower alkanoyl" includes the acyl residue of lower alkanoic acids, preferably containing from 2 to 4 carbon atoms, for example, acetyl, propionyl, and the like. The term "lower alkoxy" designates straight or branched chain saturated hydrocarbonoxy groups containing from 1 to 7 carbon atoms, preferably from 1 to 4 carbon atoms, such as methoxy, ethoxy, propoxy and the like.

A preferred class of compounds falling within the scope of formula I above are those wherein $R_1$ signifies hydrogen, halogen, trifluoromethyl or nitro and is located at the 7-position of the benzodiazepine moiety, $R_2$ is hydrogen, and $R_6$ is hydrogen or halogen and is located in the 2-position of the 5-phenyl ring, i.e. compounds of the formula

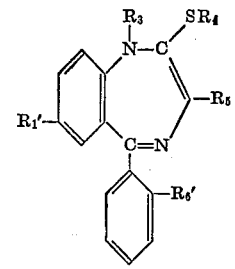

Ia wherein $R_1'$ signifies hydrogen, halogen, nitro or trifluoromethyl; $R_6'$ signifies hydrogen or halogen; and $R_3$–$R_5$ are as described above.

Another preferred class of compounds falling within the scope of formula I above are those wherein the $R_3$ substituent is lower alkyl or di-lower alkylamino-lower alkyl, i.e. compounds of the formula

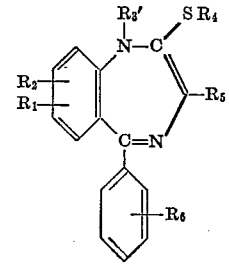

Ib wherein $R_3'$ signifies lower alkyl or di-lower alkylamino-lower alkyl and $R_1$, $R_2$ and $R_4$–$R_6$ are as described above.

The most preferred of the compounds of formula I above are:

5-(2-chlorophenyl)-1-methyl-2-methylthio-7-nitro-1H-1,4-benzodiazepine;
7-chloro-1-methyl-5-phenyl-2-methylthio-1H-1,4-benzodiazepine;
7-chloro-2-ethylthio-5-(2-fluorophenyl)-1-methyl-1H-1,4-bnezodiazepine; and
7-chloro-1-(2-diethyaminoethyl)-5-(2-fluorophenyl)-2-methylthio-1H-1,4-benzodiazepine.

The compounds of formula I above can be prepared by treating the corresponding thione of the formula

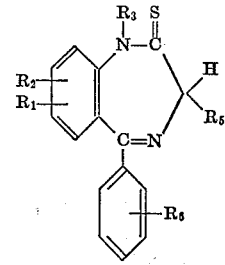

II wherein $R_1$–$R_3$, $R_5$ and $R_6$ are as described above with an appropriate alkylating agent.

The alkylation of the thione of formula II is expediently carried out by first converting said compound to its alkali metal salt, preferably the sodium salt. Conversion of the compound of formula II to its alkali metal salt is effected, for example, by reacting said compound with an alkali metal base. Suitable bases for this purpose include alkali metal alkoxides, such as sodium methoxide, potassium t-butoxide and the like, and alkali metal hydrides, such as sodium hydride and the like. Preparation of the alkali metal salt of the compound of formula II is preferably effected in the presence of an inert organic solvent such as an aromatic hydrocarbon, i.e. benzene, toluene and the like, dimethylformamide (DMF), dimethyl sulfoxide (DMSO) and tetrahydrofuran. Use of an inert organic solvent like DMF is preferred since solvents of this type can also be utilized in the alkylation step, thus eliminating the necessity of first isolating the alkali metal salt.

The alkali metal salt of a compound of formula II is then treated with an appropriate alkylating agent. Representative of the akylating agents useful for these purposes include alkyl halides, such as methyl iodide, ethyl iodide and the like, and alkyl sulfates, such as methyl sulfate; with alkyl halides being the preferred alkylating agents.

As indicated above, the alkylation reaction is preferably effected in the presence of an inert organic solvent. Temperature and pressure are not critical to the process so that for the sake of convenience the reaction is preferably effected at room temperature and atmospheric pressure.

The compounds of formula II above used as the starting materials for this process aspect are known or can be prepared in analogy to the preparation of the known compounds. Thus, for example, the compounds of formula II above may be prepared by treating a corresponding compound of the formula

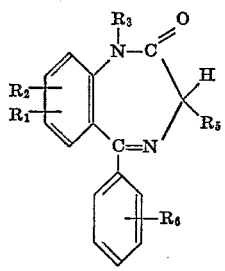

III wherein $R_1$–$R_3$, $R_5$ and $R_6$ are as described above with a sulfide, such as phosphorus pentasulfide, preferably using the sulfide in excess. The reaction is expediently effected in the presence of an inert organic solvent such as pyridine, xylene and the like, with pyridine being the preferred solvent, and at a temperature of from about 40° C. to the reflux temperature of the reaction medium.

The compounds of formula I above can be oxidized to yield a mixture of the corresponding sulfoxide of the formula

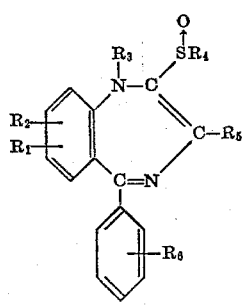

IV wherein $R_1$–$R_6$ are as described above
and sulfone of the formula

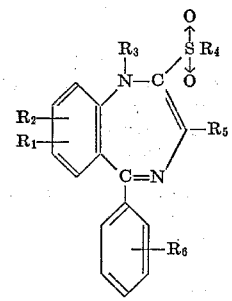

V wherein $R_1$–$R_6$ are as described above, each of which can be isolated and crystallized from the reaction mixture.

The compounds of formulae IV and V above are novel compounds and as such form a part of the present invention. The oxidation of a formula I compound to yield compounds of formulae IV and V above is preferably effected in the presence of an inert organic solvent such as a chlorinated hydrocarbon, for example, dichloromethane. Suitable oxidizing agents for this process aspect include peroxides, such as hydrogen peroxide, or peracids, such as peracetic acid, perbenzoic acid, m-chloroperbenzoic acid, and the like, with m-chloroperbenzoic acid being the preferred oxidizing agent. Temperature and pressure are not critical to this process aspect and for the sake of convenience it is preferable to perform the reaction at room temperature and atmospheric pressure.

The compounds of formula I above can be de-sulfurized by selective reduction to yield the corresponding 1H compounds of the formula

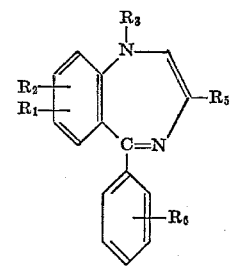

VI wherein $R_1$–$R_3$, $R_5$ and $R_6$ are as described above.

The compounds of formula VI above are novel and as such form a part of this invention. The reduction of the formula I compound is accomplished with Raney nickel in the presence of an organic base such as diethylamine, triethylamine, and the like. The reaction can be effected at room temperature or above or below room temperature. It is preferable to effect this reduction in the presence of an inert organic solvent such as acetone, ethanol, dioxane, tetrahydrofuran, benzene and the like.

The novel compounds of formula VI above can alternately be prepared by dehydrating a compound of the general formula

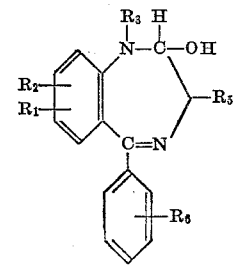

VII wherein $R_1$–$R_3$, $R_5$ and $R_6$ are as described above.

The dehydration of the compound of formula VII can be effected by treating said compound with any suitable reagent that will effect the elimination of water from the alcohol, for example, mesyl chloride, tosyl chloride, thionyl chloride and phosphorus oxychloride. When the dehydrating agent employed is a halide such as mesyl chloride, tosyl chloride, thionyl chloride, phosphorus oxychloride and the like, this reaction is conducted in the presence of an acid acceptor, preferably pyridine. The dehydration reaction is expediently effected at a temperature from room temperature to the reflux temperature of the reaction mixture, and in the presence of an inert organic solvent such as an aromatic hydrocarbon, i.e. benzene, pyridine and the like.

Further, the compounds of formula VI may be prepared by the elimination of the leaving group from a compound of the formula

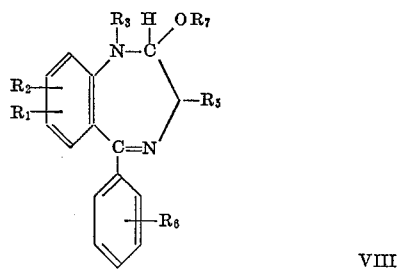

VIII wherein $R_1$–$R_3$, $R_5$ and $R_6$ are as described above and $R_7$ signifies a suitable leaving group selected from the group consisting of alkyl sulfonyl, preferably mesyl, and arylsulfonyl, preferably tosyl.

The elimination of the leaving group from the compounds of formula VIII above to yield the corresponding 2,3-double bond compound can be accomplished by treating said compound with a base. Suitable bases include alkali hydrides such as sodium hydride, triethylamine, alkali amides such as sodium amide, alkali alkoxides such as sodium methoxide and potassium t-butoxide. This reaction is expediently effected in the presence of an inert organic solvent such as ethers, hydrocarbons, e.g. benzene and toluene, dimethylformamide and the like and at temperatures between about —40° C. to about reflux temperature of the reaction mixture, depending upon the base employed.

In preparing a compound of formula VI above wherein $R_1$, $R_2$ and/or $R_6$ is nitro, it is preferred to prepare these compounds via the dehydration of a compound of formula VII or the elimination of the leaving groups from a compound of formula VIII.

It should be noted that the compound of formula VIII above is formed as an intermediate in the dehydration of the 2-hydroxy compound of formula VII above when mesyl chloride or tosyl chloride are used as the dehydrating agents. This intermediate can be isolated and the leaving group then eliminated as discussed above to yield the desired compound of formula VI; or, preferably, the dehydration can be permitted to proceed to the desired 1H compound without isolation.

The compounds of formulae I, IV, V and VI above form pharmaceutically acceptable acid addition salts with inorganic acids. Thus the compounds of the present invention form pharmaceutically acceptable acid addition salts with inorganic acids, i.e., the hydrohalic acids such as hydrochloric acid and hydrobromic acid; and with organic acids such as tartaric acid, citric acid, camphorsulfonic acid, ethanesulfonic acid, toluenesulfonic acid, salicylic acid, ascorbic acid, maleic acid, succinic acid, formic acid, acetic acid and the like.

The compounds of formulae I, IV, V and VI above, as well as their pharmaceutically acceptable acid addition salts, are useful as anticonvulsants, muscle relaxants and sedatives. Thus these compounds and their pharmaceutically acceptable salts can be used as medicaments. For example, they can be used in the form of pharmaceutical preparations which contain them or their salts in admixtures with a pharmaceutical, organic or inorganic carrier material which is suitable for enteral or parenteral applications such as, for example, water, gelatin, lactose, starches, magnesium stearate, talc, vegetable oils, gum arabic, polyalkylene glycols, Vaseline, etc. The pharmaceutical preparations can be prepared in solid form (e.g., as tablets, dragées, suppositories, capsules) or in liquid form (e.g. as solutions, suspensions, or emulsions). They may be sterilized and/or contain additives such as preserving, stabilizing, wetting or emulsifying agents, salts for varying the osmotic pressure or buffers. They can also contain other therapeutically valuable substances.

The compounds of formulae I, IV, V and VI above or their pharmaceutically acceptable salts can be administered at dosages adjusted to individual requirements and fitted to the pharmaceutical exigencies of the situation. Convenient pharmaceutical dosages are in the range of from about 2 mg. to about 200 mg. per day.

The useful anti-convulsant activity of the compounds of this invention is shown in warm-blooded animals utilizing the standard antimetrazole test. This test was carried out according to the method of Everett and Richard (J.P.E.T., 81:402, 1944). The $ED_{50}$ was calculated as the dose which would prevent convulsions in 50 percent of the mice tested after administration of 125 mg./kg. of pentylenetetrazole by the subcutaneous route. Following these test procedures, compounds such as 7-chloro-2-ethylthio-5-(2-fluorophenyl) - 1 - methyl-1H-1,4-benzodiazepine (Compound A) and 7-chloro-5-(2-fluorophenyl)-1-methyl-1H-1,4-benzodiazepine (Compound B) show an $ED_{50}$ of 0.18 and 17.6 mg./kg. respectively, indication that these compounds exhibit anti-convulsant activity.

The sedative and muscle relaxant activity of the compounds of the invention are shown using the standard foot shock test. In this test, a pair of mice is confined under a one liter beaker placed on a grid which presents shock to the feet. At least 5 fighting episodes are elicited in a 2-minute period. Pairs of mice are marked and pretreated 1 hour prior to a second shock. Logarithmic dose intervals are utilized up to a maximum of 10 mg./kg. At the 100% blocking dose, 3 out of 3 pairs must be blocked from fighting. The measurements are made at the dose level at which 100% blocking is observed and the results are expressed as the dose in mg./kg. which blocks the fighting response for one hour. Following these test procedures, compound A exhibited a $PD_{50}$ of 10 mg./kg. and compound B exhibited a $PD_{50}$ of 50 mg./kg.

The following examples are illustrative of the present invention. All temperatures are given in degrees centigrade.

EXAMPLE 1

Preparation of 5-(2-chlorophenyl)-1,3-dihydro-1-methyl-7-nitro-2H-1,4-benzodiazepine-2-thione A solution of 7 g. (0.021 M) of 1-methyl-5-(2-chlorophenyl)-7-nitro - 3H - 1,4-benzodiazepin-2(1H)-one [1] in 70 ml. of dry pyridine was treated with 5.1 g. (0.023 M) of phosphorous pentasulfide and the reaction mixture was stirred at 80° for 12 hr. and then at 90–100° for 2.5 hr. The solution was evaporated to dryness and warmed with 200 ml. of dichloromethane, which was filtered and then chromatographed over 200 g. of basic alumina. The column was first eluted with 1500 ml. of ether which was discarded, and then with a mixture of ether containing 10% ethyl acetate (v./v.). After removal of the solvent the crystalline residue was recrystallized 3 times from methanol to give the above-named product as yellow prisms, m.p. 204–206°.

---

[1] The starting material was prepared according to the procedures set forth in L. H. Sternbach, R. I. Fryer, O. Keller, W. Metlescis, G. Sach, N. Steiger, J. Med. Chem. 6, 261 (1963).

EXAMPLE 2

Preparation of 7-chloro-1-(2-diethylaminoethyl)-1,3-dihydro - 5 - (2-fluorophenyl)-2H-1,4-benzodiazepine-2-thione hydrochloride A solution of 5 g. (0.0128 M) of 7-chloro-1-(2-diethylaminoethyl) - 5 - (2-fluorophenyl)-1,3-dihydro-2H-1,4-benzodiazepin-2-one [2] in 50 ml. of dry pyridine was treated with 7.1 g. (0.032 M) of phosphorous pentasulfide, and the reaction mixture was stirred at 50° for 16 hr. and at 70° for 22 hr. The solution was cooled, poured into cold water, made basic with sodiu mhydroxide and extracted with 100 ml. of dichloromethane. The organic layer was dried over anhydrous sodium sulfate and evaporated to dryness.

The residue was dissolved in benzene and chromatographed over a column of basic alumina. Elution with 1 l. of benzene and 2.5 l. of ether gave 0.4 g. of a forerun which was discarded. Using 4 l. of ethyl acetate as the eluant, gave after removal of the solvent the crude product. Half of this material was crystallized from methanol to give the pure thione as yellow prisms, m.p. 98–100°.

Ethanolic hydrogen chloride was added to the other half of the crude base and the solution was then evaporated to dryness. The residual salt was recrystallized twice from a mixture of methanol and ether to give the monohydrochloride as white prisms, m.p. 223–225° (sealed tube).

EXAMPLE 3

Preparation of 7-chloro-1-methyl-5-phenyl-2-methylthio-1H-1,4-benzodiazepine

A solution of 3.0 g. (0.01 M) of 7-chloro-1-methyl-5-phenyl-3H-1,4-benzodiazepin-2-thione [3] in 20 ml. of dry N,N'-dimethylformamide under nitrogen was treated with 0.46 g. (0.011 M) of a 57% dispersion of sodium hydride in mineral oil. The reaction mixture was stirred for 30 min., cooled in an ice bath, and treated with 2.0 g. (0.014 M) of methyl iodide. After 1.5 hr., at room temperature, the solution was poured onto ice, and the precipitate was removed by filtration. This was dissolved in 30 ml. of dichloromethane, which was washed with 30 ml. of water, 20 ml. of saturated brine, dried over anhydrous sodium sulfate, and evaporated to dryness. The residual oil crystallized on standing and was recrystallized from methanol and then from a mixture of ether and petroleum ether to give the above-named product as orange prisms, m.p. 77–81°.

EXAMPLE 4

Preparation of 7-chloro-2-ethylthio-5-(2-fluorophenyl)-1-methyl-1H-1,4-benzodiazepine A solution of 16 g. (0.05 M) of 7-chloro-1,3-dihydro-5 - (2 - fluorophenyl)-1-methyl-2H-1,4-benzodiazepine-2-thione [4] in 40 ml. of N,N-dimethylformamide was treated with 14.1 ml. (0.06 M) of a 4.23 N solution of sodium methoxide in methanol, and after 1 hr. the mixture was cooled in an ice bath when 11.7 g. (.075 M) of ethyl iodide was added with stirring. The reaction mixture was then stirred at room temperature for 3 hr., when it was poured into 500 ml. of cold water. The precipitate was removed by filtration, and was dissolved in 75 ml. of dichloromethane which was dried over anhydrous sodium sulfate and concentrated to 30 ml. Methanol was added and the remainder of the dichloromethane was removed on the steam bath. The solution was cooled and filtered. Recrystallization of the product from a mixture of dichloromethane and methanol to give the above-named product as red prisms, m.p. 103–104°.

EXAMPLE 5

Preparation of 5-(2-chlorophenyl)-1-methyl-2-methylthio-7-nitro-1H-1,4-benzodiazepine A solution of 0.25 g. (0.000723 M) of 5-(2-chlorophenyl)-1,3-dihydro-1-methyl-7-nitro-2H - 1,4 - benzodiazepine-2-thione in 2 ml. of N,N-dimethylformamide cooled in an ice bath was treated with 0.34 ml. (0.00144 M) of 4.23 N sodium methoxide in methanol, and after 20 min., 0.2 g. (0.00144 M) of methyl iodide was added. The solution was stirred at room temperature for 1 hr. and was then poured into cold water. The mixture was filtered and the precipitate was collected, dissolved in dichloromethane (15 ml.), dried over anhydrous sodium sulfate, filtered and evaporated to dryness. The residue was crystallized from a mixture of dichloromethane and petroleum ether to give the product as deep red prisms, m.p. 135–140°.

EXAMPLE 6

Preparation of 7-chloro-1-methyl-2-methylsulfinyl-5-phenyl-1H-1,4-benzodiazepine A solution of 16 g. (0.0508 M) of 7-chloro-1-methyl-5-phenyl-2-methylthio-1H-1,4-benzodiazepine in 200 ml. of dichloromethane, cooled in an ice bath, was treated with 12 g. (0.059 M) of 85% m-chloroperbenzoic acid over a 10 min. period with stirring. After 4 hr. at room temperature, the reaction mixture was washed with dilute ammonium hydroxide (2× 150 ml.), 100 ml. of saturated brine, dried over anhydrous sodium sulfate, filtered and evaporated to dryness.

The residual oil was disolved in 50 ml. of dichloromethane and filtered through 200 g. of basic alumina. The alumina was eluted with 500 ml. of dichloromethane, 800 ml. of ethyl acetate and then 600 ml. of methanol. The methanol fraction was evaporated and the residue was crystallized from methanol and recrystallized from a mixture of dichloromethane and petroleum ether to give the above-named product as orange rods, m.p. 148–151° (sealed tube).

EXAMPLE 7

Preparation of 7-chloro-1-methyl-2-methylsulfonyl-5-phenyl-1H-1,4-benzodiazepine A solution of 1.0 g. (0.00317 M) of 7-chloro-1-methyl-5-phenyl-2-methylthio-1H-1,4-benzodiazepine in 20 ml. of dichloromethane was stirred and treated with 0.55 g. (0.0027 M) of 85% m-chloroperbenzoic acid. After 3 hr., an additional 0.4 g. (0.0023 M) of the oxidant was added and the solution was allowed to stir at room temperature for an additional 2 hr. The reaction mixture was washed with dilute ammonium hydroxide (2× 30 ml.), 20 ml. of saturated brine, dried over anhydrous sodium sulfate, filtered and evaporated to dryness. The residual oil was crystallized from methanol, and the crude product was dissolved in 10 ml. of dichloromethane and filtered through 50 g. of basic alumina. Elution with 50 ml. of dichloromethane, 200 ml. of ether and 150 ml. of ethyl acetate gave, after combination of all fractions and removal of solvent, the sulfone. This was recrystallized from a mixture of dichloromethane and methanol to give the analytically pure sample as red prisms, m.p. 184–188°.

EXAMPLE 8

Preparation of 2-bromo-4'-chloro-2'-(2-fluorobenzoyl) propionanilide

A solution of 90 g. (0.362 M) of 2-amino-5-chloro-

---
[2] The starting material was prepared according to the procedures set forth in L. H. Sternbach, G. A. Archer, J. V. Earley, R. I. Fryer, E. Reeder, N. Wasyltw, L. O. Randall, R. Banziger, *J. Med. Chem.*, 8, 815 (1965).

[3] The starting material was prepared according to the procedures set forth in G. A. Archer and L. H. Sternbach, *J. Org. Chem.*, 29, 231 (1964).

[4] The starting material was prepared according to the procedures set forth in G. A. Archer and L. H. Sternbach, *J. Org. Chem.*, 29, 231 (1964).

2'-fluorobenzophenone in 650 ml. of benzene was treated with 77 g. (0.362 M) of 2-bromopropionyl bromide and the reaction was refluxed and stirred for 2 hrs. The reaction was made basic with a dilute solution of potassium carbonate, dichloromethane (300 ml.) was added and the organic layer was separated and washed with 300 ml. of water, dried over anhydrous sodium sulfate and evaporated to dryness. It was crystallized from a mixture of ether and petroleum ether and then recrystallized from methanol to give the analide as pale yellow rods, m.p. 74–77°.

EXAMPLE 9

Preparation of 2-amino-4'-chloro-2'-(2-fluorobenzoyl)propionanilide

A solution of 115 g. (0.3 M) of 2-bromo-4'-chloro-2'-(2-fluorobenzoyl)propionanilide and 5 g. (0.03 M) of potassium iodide in 300 ml. of dichloromethane was added to 300 ml. of liquid ammonia, and the reaction was stirred for 24 hrs. using a Dry Ice condenser. After the ammonia was allowed to evaporate, the solution was washed with 2× 250 ml. of water, dried over anhydrous sodium sulfate and evaporated to dryness. The residue was dissolved in 200 ml. of benzene and filtered through 500 g. of Florisil. It was eluted with 1 l. of dichloromethane and 2 l. of ether to give an oil which still contained some starting material. Elution with 2 l. of ethyl acetate gave a 50/50 mixture of product and the cyclized product obtained in Example 10. Elution with 1 l. of methanol gave an oil which was crystallized from a mixture of ether and petroluem ether, and then recrystallized from a mixture of methanol, ether and petroleum ether to give the desima product as yellow prisms melting at 117–121°.

EXAMPLE 10

Preparation of 7-chloro-1,3-dihydro-5-(2-fluorophenyl)-3-methyl-2H-1,4-benzodiazepin-2-one A solution of 15 g. (0.047 M) of a 50/50 mixture of 2-amino-4'-chloro-2'-(2-fluorobenzoyl)propionanilide and of the product in 100 ml. of ethanol was refluxed for 5 hrs., cooled and filtered. The precipitate was recrystallized from a mixture of dichloromethane, ether and petroleum ether to give the product as white rods, m.p. 188–191°.

EXAMPLE 11

Preparation of 7-chloro-1,3-dihydro-1,3-dimethyl-5-(2-fluorophenyl)-2H-1,4-benzodiazepin-2-one A solution of 35.1 g. (0.115 M) of 7-chloro-1,3-dihydro-5-(2 - fluorophenyl)-3-methyl-2H-1,4-benzodiazepin-2-one in 200 ml. of N,N-dimethylformamide was treated with 32.6 ml. of a 4.23 N solution of sodium methoxide in methanol and after 20 min., 24.4 g. (0.172 M) of methyl iodide was added slowly with stirring. After 18 hrs., the reaction was poured into 3 l. of ice and water, and made basic with dilute ammonium hydroxide. A precipitate was filtered off, and recrystallized from methanol to give the 1,3-dimethyl derivative as white prisms, m.p. 122–127°.

EXAMPLE 12

Preparation of 7-chloro-1,3-dihydro-1,3-dimethyl-5-(2-fluorophenyl)-2H-1,4-benzodiazepin-2-thione A solution of 41 g. (0.13 M) of 7-chloro-1,3-dihydro-1,3 - dimethyl-5-(2-fluorophenyl)-2H-1,4-benzodiazepin-2-one in 200 ml. of pyridine was treated with 34.6 g. (0.156 M) of phosphorous pentasulfide and the reaction was refluxed for 4 hrs. and then poured into 1 l. of ice and water. It was made basic with ammonium hydroxide and extracted with dichloromethane (2× 300 ml.) which was then separated and washed with 300 ml. of water. The organic layer was dried over anhydrous sodium sulfate, concentrated and filtered through basic alumina. The product was eluted with 1.5 l. of dichloromethane to give after removal of solvent an oil. Elution with 1 l. of ether and 1.5 l. of ethyl acetate gave after removal of solvents an additional amount of the oil. All fractions were combined and crystallized from a mixture of ether and petroleum ether then recrystallized from the same solvents to give the product as white prisms, m.p. 104–109°.

EXAMPLE 13

Preparation of 7-chloro-1,3-dimethyl-5-(2-fluorophenyl)-2-methylthio-1H-1,4-benzodiazepine A solution of 3.3 g. (0.01 M) of 7-chloro-1,3-dihydro-1,3-dimethyl-5-(2-fluorophenyl) - 2H - 1,4 - benzodiazepin-2-thione in 15 ml. of N,N-dimethylformamide was treated with 4.8 ml. (0.02 M) of 4.23 N solution of sodium methoxide in methanol and after 30 min., the mixture was cooled in an ice bath and 2.8 g. (0.02 M) of methyl iodide was added dropwise with stirring. After 18 hrs., it was poured into 150 ml. of cold water, filtered and the precipitate was dissolved in 75 ml. of dichloromethane. This was washed with dilute potassium carbonate solution (50 ml.), dried over anhydrous sodium sulfate and evaporated to dryness. The residue was crystallized from methanol and recrystallized from methanol once more to give the product as orange prisms, m.p. 149–152°.

EXAMPLE 14

Preparation of 7-chloro-1,3-dimethyl-5-(2-fluorophenyl)-2-methylsulfonyl-1H-1,4-benzodiazepine A solution of 2.2 g. (0.00634 M) of 7-chloro-1,3-dimethyl-5-(2-fluorophenyl) - 2 - methylthio-1H-1,4-benzodiazepine in 30 ml. of dichloromethane was cooled in an ice bath and then treated with 2.9 g. (0.014 M) of 85% m-chloroperbenzoic acid. After 18 hrs., the reaction mixture was poured into 100 ml. of dichloromethane, which was then washed with 75 ml. of 10% potassium carbonate solution, water (2× 75 ml.), a saturated solution of brine (75 ml.) and dried over anhydrous sodium sulfate. The solvent was removed and the residue crystallized from methanol and then recrystallized from CH$_3$OH to give the pure product as yellow prisms, m.p. 138–140°.

EXAMPLE 15

Preparation of 7-chloro-1-(2-diethylaminoethyl)-5-(2-fluorophenyl)-2-methylthio-1H-1,4-benzodiazepine A solution of 0.5 g. (0.0012 M) of 7-chloro-1-(2-diethylaminoethyl) - 1,3 - dihydro-5-(2-fluorophenyl)-2H-1,4-benzodiazepine-2-thione in 4 ml. of N,N-dimethylformamide was cooled in an ice bath and treated with 0.56 ml. (0.0024 M) of a 4.23 N sodium methoxide solution in methanol. After 30 min., 0.34 g. (0.0024 M) of methyl iodide was added with stirring and the reaction was allowed to stand for 18 hrs. at room temperature. It was then poured into 150 ml. of a water and ice mixture, and the red gum was separated and dissolved in 50 ml. of dichloromethane which was washed with 30 ml. of a saturated brine solution, dried over anhydrous sodium sulfate and evaporated to dryness.

The residue was dissolved in 3 ml. of dichloromethane and developed on a silica gel thick layer plate in ethyl acetate. The red product was scraped off the plate, stirred with methanol and filtered. The filtrates were evaporated, dissolved in dichloromethane and filtered and evaporated to give the analytically pure product as a red oil.

EXAMPLE 16

Preparation of 7-chloro-5-(2-fluorophenyl)-1-methyl-1H-1,4-benzodiazepine

A mixture of 1 g. of 7-chloro-5-(2-fluorophenyl)-1-methyl - 2 - thioethyl-1H-1,4-benzodiazepine, 10 g. of Raney nickel, 20 ml. of diethylamine and 20 ml. of benzene was stirred at room temperature for 6 hrs. under nitrogen. The residue obtained after filtration and evaporation was chromatographed on 30 g. of silica gel treated with diethylamine in hexane. The red resin eluted with 10% ether in hexane was crystallized from ether/hexane to yield the product as dark red crystals, m.p. 130–142°.

EXAMPLE 17

Preparation of 7-chloro-1-methyl-5-phenyl-2-methylthio-1H-1,4-benzodiazepine

Tablet formulation:

| | |
|---|---|
| 7 - chloro - 1-methyl-5-phenyl-2-methylthio-1H-1,4-benzodiazepine  mg./tablet | 25 |
| Dicalcium phosphate dihydrate, unmilled  do | 175 |
| Corn starch  do | 24 |
| Magnesium stearate  do | 1 |
| Total weight  mg. | 225 |

Procedure:
(1) 7 - Chloro - 1-methyl-5-phenyl-2-methylthio-1H-1,4-benzodiazepine and corn starch were mixed together and passed through a #00 screen in Model "J" Fitzmill with hammers forward.
(2) This premix was then mixed with dicalcium phosphate and one-half of the magnesium stearate, passed through a #1A screen in Model "J" Fitzmill with knives forward, and slugged.
(3) The slugs were passed through a #2A plate in a Model "D" Fitzmill at slow speed with knives forward, and the remaining magnesium stearate was added.
(4) The mixture was mixed and compressed.

EXAMPLE 18

Preparation of 7-chloro-1-methyl-5-phenyl-2-methylthio-1H-1,4-benzodiazepine

Capsule formulation:

| | |
|---|---|
| 7 - chloro - 1-methyl-5-phenyl-2-methylthio-1H-1,4-benzodiazepine  mg./capsule | 2 |
| Lactose, U.S.P.  do | 173 |
| Corn starch, U.S.P.  do | 30 |
| Talc, U.S.P.  do | 5 |
| Total weight  mg. | 210 |

Procedure:
(1) 7 - Chloro - 1-methyl-5-phenyl-2-methylthio-1H-1,4-benzodiazepine, lactose and corn starch were mixed in a suitable mixer.
(2) The mixture was further blended by passing through a Fitzpatrick Comminuting Machine with a #1A screen with knives forward.
(3) The blended powder was returned to the mixer, the talc added and blended thoroughly.
(4) The mixture was filled into #4 hard-shell gelatin capsules on a Parke-Davis capsulating machine. (Any similar type capsulating machine may be used.)

EXAMPLE 19

Preparation of 7-chloro-1-methyl-5-phenyl-2-methylthio-1H-1,4-benzodiazepine

Suppository formulation:

| | Per 1.3 gm. Suppository, gm. |
|---|---|
| 7 - chloro - 1-methyl-5-phenyl-2-methylthio-1H-1,4-benzodiazepine | 0.025 |
| Wecobee M[1] | 1.230 |
| Carnauba wax | 0.045 |

[1] E. F. Drew Co., 522 5th Ave., New York, N.Y.

Procedure:
(1) The Wecobee M and the carnauba wax were melted in a suitable size glass-lined container (stainless steel may also be used), mixed well and cooled to 45° C.
(2) 7 - Chloro - 1-methyl-5-phenyl-2-methylthio-1H-1,4-benzodiazepine which had been reduced to a fine powder with no lumps, was added and stirred until completely and uniformly dispersed.
(3) The mixture was poured into suppository molds to yield suppositories having an individual weight of 1.3 gms.
(4) The suppositories were cooled and removed from molds. They were individually wrapped in wax paper for packaging. (Foil may also be used.)

EXAMPLE 20

Preparation of 7-chloro-1-methyl-5-phenyl-2-methylthio-1H-1,4-benzodiazepine

Tablet formulation:

| | |
|---|---|
| 7 - chloro - 1-methyl-5-phenyl-2-methylthio-1H-1,4-benzodiazepine  mg./tablet | 10 |
| Lactose, U.S.P.  do | 202 |
| Corn starch, U.S.P.  do | 80 |
| Calcium stearate  do | 8 |
| Amijel B011[1]  do | 20 |
| Total weight  mg. | 320 |

[1] A prehydrolyzed food grade corn starch. Any similar prehydrolyzed corn starch may be used. Purchased from: Corn Products Co., 10 E. 56th St., New York, N.Y.

Procedure:
(1) 7-Chloro-1-methyl-5-phenyl-2-methylthio-1H-1,4-benzodiazepine, lactose, corn starch, and Amijel B011 were blended in a suitable mixer.
(2) The mixture was granulated to a heavy paste with water and the moist mass was passed through a #12 screen. It was then dried overnight at 110° F.
(3) The dried granules were passed through a #16 screen and transferred to a suitable mixer. The calcium stearate was added and mixed until uniform.
(4) The mixture was compressed at a tablet weight of 320 mg. using tablet punches having a diameter of approximately ⅜". (Tablets may be either flat or biconvex and may be scored if desired.)

EXAMPLE 21

Preparation of 7-chloro-1-methyl-5-phenyl-2-methylthio-1H-1,4-benzodiazepine

Parenteral formulation:

| | |
|---|---|
| 7-chloro-1-methyl-5-phenyl-2-methylthio - 1H-1,4-benzodiazepine  mg./ml | 5 |
| Propylene glycol  ml | 0.4 |
| Benzyl alcohol  ml | 0.015 |
| Ethanol, U.S.P.  ml | 0.105 |
| Water for injection q.s. to 1 ml. | |
| Sodium acetate  mg./ml | 1.4 |
| Acetic acid glacial  mg./ml | 0.6 |

Procedure:
(1) Dissolve 7-chloro-1-methyl-5-phenyl-2-methylthio-1H-1,4-benzodiazepine in 15 ml. of benzyl alcohol.
(2) Add 400 ml. propylene glycol and 105 ml. of ethanol.
(3) Add sodium acetate and acetic acid previously dissolved in water for injection.
(4) Add sufficient water for injection to bring volume to 1,000 ml.
(5) Filter through #02 Selas candle, fill into glass ampuls, gas with nitrogen and seal.
(6) Autoclave at 10 p.s.i. for 30 minutes.

EXAMPLE 22

In analogy to the procedures set forth in Examples 17 through 21 above, capsule, suppository, tablet and parenteral formulations can be prepared using as the active ingredient:

5-(2-chlorophenyl)-1-methyl-2-methylthio-7-nitro-1H-1,4-benzodiazepine 7-chloro-2-ethylthio-5-(2-fluorophenyl)-1-methyl-1H-1,4-benzodiazepine 7-chloro-5-(2-fluorophenyl)-1-methyl-1H-1,4-benzodiazepine.

EXAMPLE 23

In analogy to the procedures set forth in Examples 17 through 20 above, capsule, suppository, and tablet formulations can be prepared using as the active ingredients:

7-chloro-1-methyl-2-methylsulfonyl-5-phenyl-1H-1,4-benzodiazepine and 7-chloro-1-methyl-2-methylsulfinyl-5-phenyl-1H-1,4-benzodiazepine.

EXAMPLE 24

Preparation of 7-chloro-1-methyl-2-methylsulfinyl-5-phenyl-1H-1,4-benzodiazepine Parenteral formulation:

| | |
|---|---|
| 7-chloro-1-methyl-2-methylsulfinyl-5 - phenyl-1H-1,4-benzodiazepine _____mg./ml__ | 1 |
| Propylene glycol _____ml__ | 0.4 |
| Benzyl alcohol _____ml__ | 0.015 |
| Ethanol, U.S.P. _____ml__ | 0.105 |
| Water for injection q.s. to 1 ml. | |
| Sodium acetate _____mg./ml__ | 1.4 |
| Acetic acid glacial _____mg./ml__ | 0.6 |

Procedure:
(1) Dissolve 7-chloro-1-methyl-2-methylsulfinyl-5-phenyl-1H-1,4-benzodiazepine in 15 ml. of benzyl alcohol.
(2) Add 400 ml. propylene glycol and 105 ml. of ethanol.
(3) Add sodium acetate and acetic acid previously dissolved in water for injection.
(4) Add sufficient water for injection to bring volume to 1,000 ml.
(5) Filter through #02 Selas candle, fill into glass ampuls, gas with nitrogen and seal.
(6) Autoclave at 10 p.s.i. for 30 minutes.

EXAMPLE 25

In analogy to the procedures set forth in Example 24, a parenteral formulation can be prepared using as the active ingredient: 7-chloro-1-methyl-2-methylsulfonyl-5-phenyl-1H-1,4-benzodiazepine.

EXAMPLE 26

Preparation of 7-chloro-5-(2-fluorophenyl)-1-methyl-1H-1,4-benzodiazepine

A mixture of 4.5 g. of 7-chloro-2,3-dihydro-5-(2-fluorophenyl) - 2 - hydroxy-1-methyl - 1H - 1,4-benzodiazepine (prepared by reduction of the corresponding 2-one with lithium aluminum hydride), 50 ml. of benzene, 30 ml. of pyridine and 3 ml. of mesyl chloride was refluxed for 10 minutes and then poured on 10% aqueous sodium carbonate solution. The benzene layer was separated, dried and evaporated. The residue was dissolved in toluene, filtered through alumina and evaporated azeotropically to remove the pyridine. Crystallation of the residue from ether yielded red crystals which were further purified by chromatography in 150 g. of silica gel using 5% ethyl acetate in ethylene chloride. Pure fractions were crystallized from ether to give the above-named product, m.p. 139–142°.

EXAMPLE 27

Preparation of 7-chloro-1-methyl-5-phenyl-1H-1,4-benzodiazepine

This compound was obtained as described above in Example 26 from the reaction of 7-chloro-2,3-dihydro-2 - hydroxy - 1 - methyl-5-phenyl-1H-1,4-benzodiazepine with mesyl chloride or tosyl chloride in pyridine. Crystallization of chromatographically purified material from hexane yielded red product with m.p. 76–79°.

What is claimed is:
1. A compound of the formula

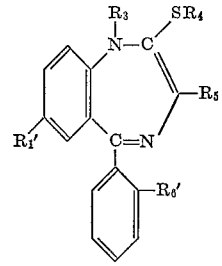

wherein $R_1'$ signifies hydrogen, halogen, nitro or trifluoromethyl; $R_3$ is selected from the group consisting of lower alkyl, lower alkenyl, lower alkynyl, cycloalkyl-lower alkyl, and di-lower alkylamino-lower alkyl; $R_4$ is lower alkyl; $R_5$ is hydrogen or lower alkyl; $R_6'$ signifies hydrogen or halogen
and the pharmaceutically acceptable acid addition salts thereof.

2. A compound of claim 1 wherein $R_1'$ signifies halogen and $R_5$ and $R_6'$ are hydrogen.

3. The compound of claim 2 wherein $R_1'$ signifies chlorine and $R_3$ and $R_4$ signify methyl, i.e., a compound of the formula 7-chloro-1-methyl-5-phenyl-2-methylthio-1H-1,4-benzodiazepine.

4. A compound of claim 1 wherein $R_1'$ signifies halogen or nitro, $R_5$ signifies hydrogen, and $R_6'$ signifies halogen.

5. The compound of claim 4 wherein $R_1'$ is nitro, $R_3$ and $R_4$ are methyl and $R_6'$ is chlorine, i.e. a compound of the formula 5-(2-chlorophenyl)-1-methyl-2-methylthio-7-nitro-1H-1,4-benzodiazepine.

6. The compound of claim 4 wherein $R_1'$ is chlorine, $R_3$ is methyl, $R_4$ is ethyl and $R_6'$ is fluorine, i.e., a compound of the formula 7-chloro-2-ethylthio-5-(2-fluorophenyl)-1-methyl-1H-1,4-benzodiazepine.

7. The compound of claim 4 wherein $R_1'$ is chlorine, $R_3$ is diethylaminoethyl, $R_4$ is methyl and $R_6'$ is fluorine, i.e. a compound of the formula 7-chloro-1-(2-diethylaminoethyl) - 5-(2-fluorophenyl)-2 - methylthio-1H-1,4-benzodiazepine.

References Cited

UNITED STATES PATENTS 3,422,091    1/1969    Archer et al. ____ 260—239 BD

JOSEPH A. NARCAVAGE, Primary Examiner

U.S. Cl. X.R.

424—244